US009740303B2

(12) United States Patent
Ueno et al.

(10) Patent No.: US 9,740,303 B2
(45) Date of Patent: Aug. 22, 2017

(54) POINTING SYSTEM, CONTROL DEVICE, AND CONTROL METHOD

(75) Inventors: Masatoshi Ueno, Kanagawa (JP); Osamu Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 873 days.

(21) Appl. No.: 13/155,595

(22) Filed: Jun. 8, 2011

(65) Prior Publication Data

US 2011/0310009 A1  Dec. 22, 2011

(30) Foreign Application Priority Data

Jun. 17, 2010 (JP) ................................. 2010-138224

(51) Int. Cl.
| | |
|---|---|
| *G06F 3/033* | (2013.01) |
| *G09G 5/08* | (2006.01) |
| *G02B 27/20* | (2006.01) |
| *G06F 3/0346* | (2013.01) |
| *G06F 3/03* | (2006.01) |

(52) U.S. Cl.
CPC .......... *G06F 3/0346* (2013.01); *G06F 3/0304* (2013.01)

(58) Field of Classification Search
CPC ...... G06F 3/033; G06F 3/0308; G06F 3/0325; G06F 3/03542; G06F 3/037; G06F 3/0386; G06F 3/0425; G06F 3/048; G06K 9/36; G06K 7/10; G09G 5/00; G09G 5/08; G09G 3/30; G01B 11/14; G03B 21/00; G03B 21/14; G03B 21/26; G03B 7/04;

(Continued)

(56) References Cited

U.S. PATENT DOCUMENTS

| | | | | |
|---|---|---|---|---|
| 5,448,261 A | * | 9/1995 | Koike et al. | ................... 345/158 |
| 5,521,634 A | * | 5/1996 | McGary | ................ G01S 3/7864 |
| | | | | 348/143 |

(Continued)

FOREIGN PATENT DOCUMENTS

| | | |
|---|---|---|
| JP | 03-202916 | 9/1991 |
| JP | 07-200160 | 8/1995 |

(Continued)

OTHER PUBLICATIONS

Japanese Patent Office, Office Action issued in connection with Japanese Patent Application No. 2010-138224, dated Dec. 17, 2013. (3 pages).

*Primary Examiner* — Ilana Spar
*Assistant Examiner* — Nguyen H Truong
(74) *Attorney, Agent, or Firm* — K&L Gates LLP

(57) ABSTRACT

A pointing system including: a pointing device including an operation portion and a light-emitting portion that emits light according to an operation to the operation portion; and a control device including an image pickup portion that picks up light from the light-emitting portion when the light-emitting portion emits light and outputs an image including information on a light spot of the light, a display portion that includes a screen and displays a pointer on the screen, and a control portion that judges, as well as judge a movement of the light spot based on the information on the light spot in the image and move the pointer on the screen based on the movement of the light spot, whether the light spot is turned off based on the information on the light spot in the image and executes processing related to a click when the light spot is turned off.

18 Claims, 11 Drawing Sheets

(58) Field of Classification Search
CPC . G03B 7/06; G03B 7/12; G02B 27/20; G01C 3/08; G01C 25/00; G01C 21/00
USPC .................................................. 345/156–184
See application file for complete search history.

(56) References Cited

U.S. PATENT DOCUMENTS

| | | |
|---|---|---|
| 2002/0186351 A1* | 12/2002 | Gnanamgari et al. .......... 353/42 |
| 2003/0210229 A1* | 11/2003 | Nishimura ............ G06F 3/0304 345/157 |
| 2004/0207597 A1* | 10/2004 | Marks .......................... 345/156 |
| 2006/0007141 A1* | 1/2006 | Wilson et al. ................ 345/158 |
| 2006/0244719 A1* | 11/2006 | Brigham et al. ............. 345/156 |
| 2008/0111789 A1* | 5/2008 | Young ...................... G06K 9/22 345/157 |
| 2009/0309834 A1* | 12/2009 | Adams .......................... 345/166 |
| 2011/0066984 A1* | 3/2011 | Li ................................. 715/863 |
| 2011/0267260 A1* | 11/2011 | Jang et al. .................... 345/156 |

FOREIGN PATENT DOCUMENTS

| | | |
|---|---|---|
| JP | 2006-338328 | 12/2006 |
| JP | 2007-104567 | 4/2007 |
| JP | 2007-213197 | 8/2007 |
| JP | 2009-301564 | 12/2009 |

* cited by examiner

_US 9,740,303 B2_

POINTING SYSTEM, CONTROL DEVICE, AND CONTROL METHOD

CROSS REFERENCES TO RELATED APPLICATIONS

The present application claims priority to Japanese Priority Patent Application JP 2010-138224 filed in the Japanese Patent Office on Jun. 17, 2010, the entire content of which is hereby incorporated by reference.

BACKGROUND

The present application relates to a technique involving a pointing system that is equipped with a pointing device including a light-emitting portion and a control device that picks up light from the light-emitting portion and moves a pointer displayed on a screen based on the pickup image.

From the past, there is known a technique in which light such as infrared light that is emitted from a remote controller is picked up by an image pickup portion provided on a television apparatus side, and a coordinate point on a screen indicated by the remote controller is detected based on the pickup image (see Japanese Patent Application Laid-open No. 2007-213197; hereinafter, referred to as Patent Document 1).

In the technique disclosed in Patent Document 1, a coordinate designation button 28 provided on a remote controller 2 is pressed by a user first. Then, code-modulated infrared rays are emitted from 6 LEDs (Light Emitting Diodes) 22 to 27 provided on the remote controller 2. A CCD (Charge Coupled Device) sensor provided in a television apparatus 1 picks up the infrared rays emitted from the LEDs and transmits them to a remote controller recognition control portion 36. The remote controller recognition control portion 36 executes various operations based on the pickup image and calculates a coordinate position on a screen. When a button or the like is displayed at the calculated coordinate position on the screen, processing of selecting that button or the like is executed.

SUMMARY

Incidentally, in recent years, GUIs (Graphical User Interfaces) such as a pointer and an icon that are widely used in PCs (Personal Computers) are now starting to be used in living rooms etc. with, for example, televisions as image media.

Under such an environment, a technique that enables a pointer displayed on a screen to easily move using a remote controller (pointing device) that emits light such as infrared rays is being demanded. Further, a technique that enables operations such as a click to be easily performed using a remote controller (pointing device) is also being demanded.

In view of the circumstances as described above, there is a need for a technique involving a pointing system that is capable of easily moving a pointer displayed on a screen using a pointing device that emits light such as infrared rays and with which operations such as a click can be performed with ease.

According to an embodiment of the present disclosure, there is provided a pointing system including a pointing device and a control device.

The pointing device includes an operation portion and a light-emitting portion.

The light-emitting portion emits light in accordance with an operation to the operation portion.

The control device includes an image pickup portion, a display portion, and a control portion.

The image pickup portion picks up light from the light-emitting portion at a time the light-emitting portion emits light and outputs an image including information on a light spot of the light.

The display portion includes a screen and displays a pointer on the screen.

The control portion judges, as well as judge a movement of the light spot based on the information on the light spot in the image and move the pointer on the screen based on the movement of the light spot, whether the light of the light spot is turned off based on the information on the light spot in the image and executes processing related to a click at a time the light of the light spot is turned off.

The "processing related to a click" includes single-click processing and double-click processing.

In the pointing system, when a user operates the operation portion such as an operation button provided on the pointing device, the light-emitting portion of the pointing device emits light. The light emitted from the light-emitting portion is picked up by the image pickup portion of the control device. When the user operates the pointing device 3-dimensionally while operating the operation portion, the light spot moves within the pickup image, and the movement of the light spot is judged by the control portion. The control portion moves the pointer on the screen in accordance with the movement of the light spot. As a result, the user can easily move the pointer on the screen by operating the pointing device 3-dimensionally while operating the operation portion such as an operation button provided on the pointing device.

On the other hand, when the user cancels the operation to the operation portion such as an operation button provided on the pointing device, the light of the light-emitting portion is turned off, and the light of the light spot in the image picked up by the image pickup portion of the control device is turned off. The turn-off of the light is judged by the control portion, and the processing related to a click is executed at the time the light is turned off. As a result, the user can easily perform operations such as a click by canceling the operation to the operation button of the pointing device.

In the pointing system, the control portion may judge whether the movement of the light spot satisfies a predetermined condition and switch, when the movement of the light spot satisfies the predetermined condition, a mode between a left-click processing mode in which processing related to a left-click is executed at the time the light of the light spot is turned off and a right-click processing mode in which processing related to a right-click is executed at the time the light of the light spot is turned off.

The "processing related to a left-click" includes single-left-click processing and "double-left-click processing".

The "processing related to a right-click" includes single-right-click processing and "double-right-click processing".

The condition of the movement of the light spot in a case where the right-click processing mode is switched to the left-click processing mode and the condition of the movement of the light spot in a case where the left-click processing mode is switched to the right-click processing mode may either be the same or different.

In the pointing system, the user grabs the pointing device and operates it 3-dimensionally to make a specific movement (e.g., move swiftly to the right and stop or move swiftly to the left and stop). As a result, a switch can be made between the right-click processing mode and the left-click processing mode. By canceling the operation to the operation portion during the right-click processing mode, the user can perform a right-click operation, and by canceling the operation to the operation portion during the left-click processing mode, the user can perform a left-click operation.

In the pointing system, the control portion may judge whether the movement of the light spot satisfies a predetermined condition and switch, when the movement of the light spot satisfies the predetermined condition, a click processing mode in which the pointer is moved in accordance with the movement of the light spot and the processing related to a click is executed at the time the light of the light spot is turned off to a drag processing mode in which drag is executed in accordance with the movement of the light spot and drop is executed at the time the light of the light spot is turned off.

In the pointing system, the user can switch the click processing mode to the drag processing mode by grabbing the pointing device and operating it 3-dimensionally to make a specific movement (e.g., stop for certain time). In the drag processing mode, the user can perform drag by operating the pointing device 3-dimensionally and perform drop by canceling the operation to the operation portion.

In the pointing system, the control portion may judge whether the movement of the light spot satisfies a predetermined condition and switch, when the movement of the light spot satisfies the predetermined condition, a click processing mode in which the pointer is moved in accordance with the movement of the light spot and the processing related to a click is executed at the time the light of the light spot is turned off to a scroll processing mode in which scroll is executed in accordance with the movement of the light spot.

In the pointing system, the user can switch the click processing mode to the scroll processing mode by grabbing the pointing device and operating it 3-dimensionally to make a specific movement (e.g., move swiftly in vertical and lateral directions).

In the pointing system, the light-emitting portion may flicker at a predetermined cycle at the time the operation portion is operated, and the control portion may judge which of the turn-off of the light of the light spot based on the flickering of the light-emitting portion and the turn-off of the light of the light spot based on a cancel of the operation to the operation portion the turn-off of the light is based on the information on the light spot in the image, avoid executing the processing related to a click when the turn-off of the light of the light spot is judged to be the turn-off of the light based on the flickering, and execute the processing related to a click when the turn-off of the light of the light spot is judged to be the turn-off of the light based on the cancel of the operation to the operation portion.

In the pointing system, since the light-emitting portion flickers at a predetermined cycle while the operation portion of the pointing device is being operated, power of the pointing device can be saved.

On the other hand, the control portion of the control device judges which of the turn-off of the light based on the flickering of the light-emitting portion and the turn-off of the light based on the cancel of the operation to the operation portion the turn-off of the light of the light spot is. When the turn-off of the light is based on the flickering, the control portion does not execute the processing related to a click. As a result, it is possible to prevent the processing related to a click from being executed while the light-emitting portion is flickering so as to execute false operations.

In the pointing system, the control portion may calculate a movement amount of the light spot and switch, in accordance with a level of the movement amount, a mode between a first mode in which the pointer is moved with respect to the movement amount at a first movement rate and a second mode in which the pointer is moved with respect to the movement amount at a second movement rate larger than the first movement rate.

With this structure, when the 3-dimensional movement of the pointing device is small, the movement of the pointer on the screen becomes markedly small. As a result, it is possible to suppress wobbling of the pointer on the screen due to a influence of a shake.

In the pointing system, the control portion may judge a size of the light spot in the image, set, in the image picked up by the image pickup portion, a size of a base frame corresponding to the screen of the display portion to a size corresponding to the size of the light spot, and move the pointer on the screen in accordance with the movement of the light spot in the base frame.

In the pointing system, the base frame is set in the image based on the size of the light spot, that is, a distance between the pointing device and the control device. Since the pointer is moved in accordance with the movement of the light spot within the base frame that is set based on the distance, control of the movement of the pointer based on the distance becomes possible.

In the pointing system, the control portion may set a light spot search frame around the base frame in the image and judge the movement of the light spot and the turn-off of the light of the light spot in the light spot search frame.

In the pointing system, since the light spot search frame is set and the movement and turn-off of the light spot within the light spot search frame are judged, an influence of ambient light can be eliminated.

According to an embodiment, there is provided a control device picking up light from a light-emitting portion of a pointing device including an operation portion and the light-emitting portion that emits light in accordance with an operation to the operation portion and moves a pointer on a screen based on information on a light spot of the light included in the pickup image. The control device includes an image pickup portion, a display portion, and a control portion.

The image pickup portion is configured to pick up light from the light-emitting portion at a time the light-emitting portion emits light and output the image including information on the light spot.

The display portion includes the screen and is configured to display the pointer on the screen.

The control portion is configured to judge, as well as judge a movement of the light spot based on the information on the light spot in the image and move the pointer on the screen based on the movement of the light spot, whether the light of the light spot is turned off based on the information on the light spot in the image and execute processing related to a click at a time the light of the light spot is turned off.

According to an embodiment, there is provided a control method including picking up light from a light-emitting portion that emits light in accordance with an operation to an operation portion.

An image including information on a light spot of the light is output.

A movement of the light spot is judged based on the information on the light spot in the pickup image.

A pointer is moved on a screen in accordance with the movement of the light spot.

Turn-off of the light of the light spot is judged based on the information on the light spot in the image.

Processing related to a click is executed at a time the light of the light spot is turned off.

As described above, according to the embodiments of the present disclosure, it is possible to provide a technique involving a pointing system that is capable of easily moving a pointer displayed on a screen using a pointing device that emits light such as infrared rays and with which operations such as a click can be performed with ease.

Additional features and advantages are described herein, and will be apparent from the following Detailed Description and the figures.

BRIEF DESCRIPTION OF THE FIGURES

FIG. 10 is a diagram for explaining processing carried out when moving the pointer and processing of a click and the like;

FIG. 11 is a diagram for explaining the processing carried out when moving the pointer and the processing of a click and the like;

FIG. 12 is a diagram for explaining the processing carried out when moving the pointer and the processing of a click and the like;

FIG. 13 is a diagram for explaining the processing carried out when moving the pointer and the processing of a click and the like.

DETAILED DESCRIPTION

Embodiments of the present application will be described below in detail with reference to the drawings.

First Embodiment

Overall Structure of Pointing System 100 and Structures of Components

Figure 1:
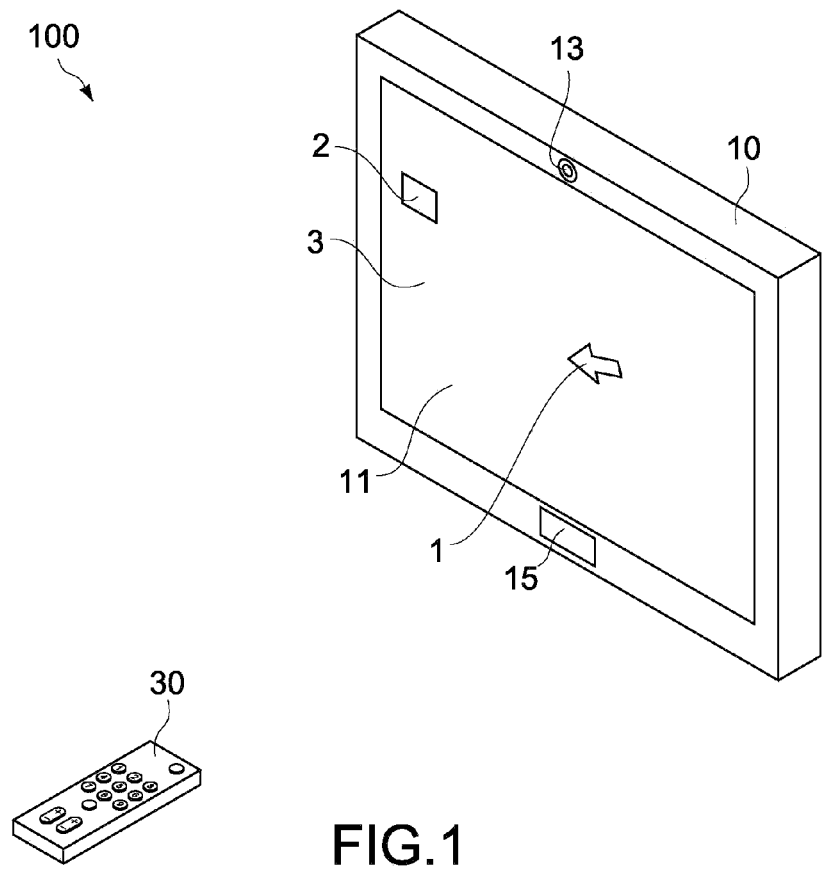
FIG. 1 is a diagram showing a pointing system according to an embodiment.

FIG. 1 is a diagram showing a pointing system 100 according to a first embodiment.

As shown in FIG. 1, the pointing system 100 includes a remote controller 30 (pointing device) and a display-portion-integrated PC 10 (control device) (hereinafter, simply referred to as PC 10) including a television broadcast reception function.

Figure 2:
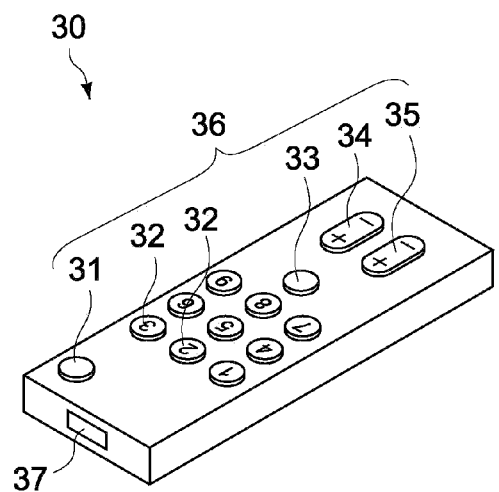
FIG. 2 is a perspective view of a remote controller.
Figure 3:
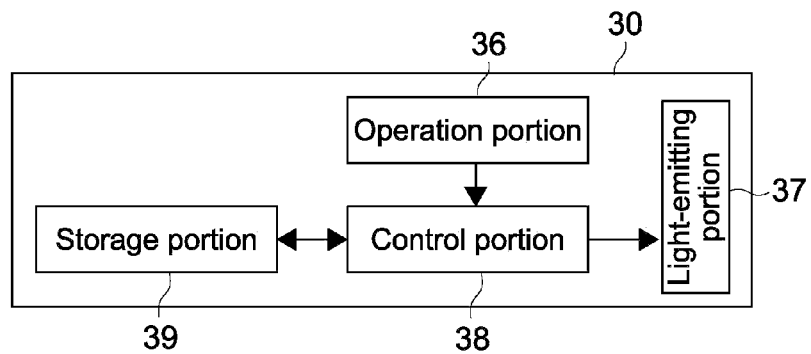
FIG. 3 is a block diagram showing an internal structure of the remote controller.

FIG. 2 is a perspective view of the remote controller 30. FIG. 3 is a block diagram showing an internal structure of the remote controller 30.

As shown in FIGS. 2 and 3, the remote controller 30 includes an operation portion 36, a storage portion 39, a control portion 38, and a light-emitting portion 37.

The operation portion 36 includes various operation buttons such as a power button 31, channel buttons 32, a switch button 33 that makes a switch between a PC mode and a television broadcast mode, a channel up-down button 34, and a volume up-down button 35. Instead of a press-type operation button, the operation portion 36 may be a touch-type operation portion 36 that uses a capacitance sensor. The operation portion 36 may take any form as long as it can be operated by a user.

The storage portion 39 includes a nonvolatile memory such as a ROM (Read Only Memory) that stores various programs requisite for controlling the remote controller 30. Further, the remote controller 30 includes a volatile memory such as a RAM (Random Access Memory) that is used as a working area for operations of the control portion 38.

The light-emitting portion 37 is constituted of, for example, an infrared LED (Light Emitting Diode) that emits infrared rays under control of the control portion 38.

The control portion 38 is constituted of, for example, a CPU (Central Processing Unit) and collectively controls parts of the remote controller 30. The control portion 38 controls the light-emitting portion 37 to emit infrared rays when the various buttons of the operation portion 36 are pressed. At this time, the control portion 38 controls the light-emitting portion 37 to emit infrared rays modulated by a remote control code corresponding to the pressed button.

Here, when the various buttons of the operation portion 36 are operated, the remote controller 30 may take either a form in which the light-emitting portion 37 constantly emits light or a form in which the light-emitting portion 37 flickers at a predetermined cycle while the buttons are being operated. Although the remote controller 30 may take either form, in the descriptions of this embodiment, the light-emitting portion 37 will be described as taking the form in which it flickers at a predetermined cycle.

It should be noted that in the form in which the light-emitting portion 37 flickers, power of the remote controller 30 can be saved, and a lifetime of batteries (not shown) and the like that are incorporated inside the remote controller 30 can be prolonged.

A generally-used remote controller 30 can be used as it is as a remote controller 30 for a display-portion-integrated PC or a television apparatus. By processing of the PC 10, the remote controller 30 functions as a pointing device that is capable of moving a pointer 1 on a screen 3 to be described later and executing operations such as a click.

Figure 4:
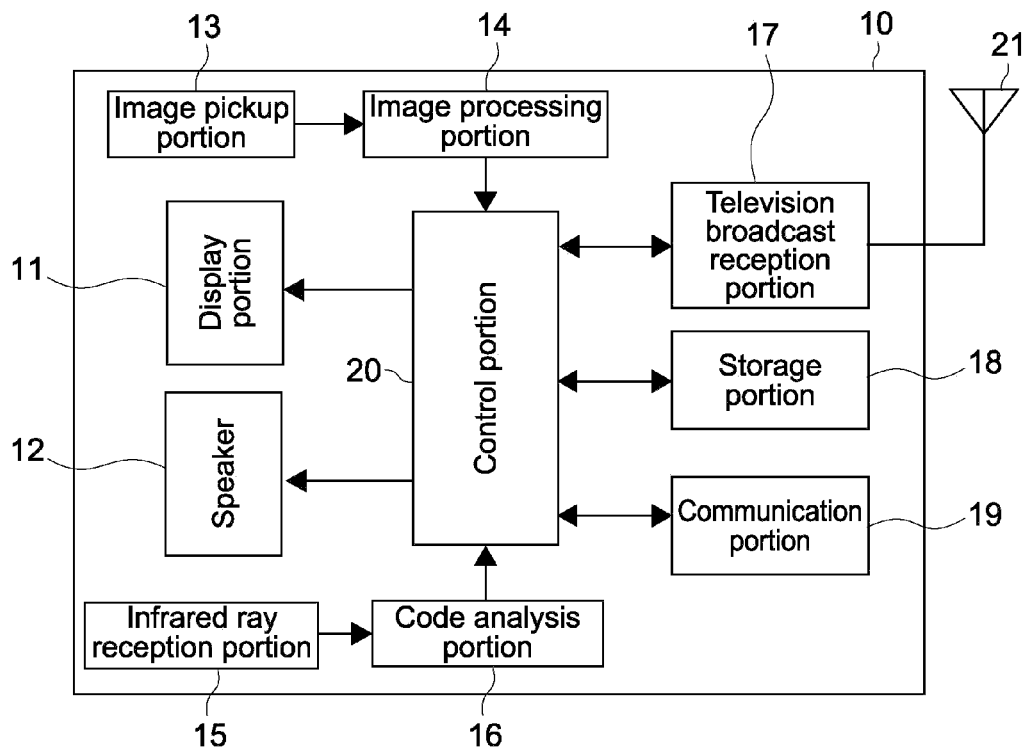
FIG. 4 is a block diagram showing an internal structure of a PC (Personal Computer)

FIG. 4 is a block diagram showing an internal structure of the PC 10 of this embodiment.

Referring to FIGS. 1 and 4, the PC 10 includes a display portion 11, a speaker 12, an image pickup portion 13, an image processing portion 14, an infrared ray reception portion 15, a code analysis portion 16, a control portion 20, a television broadcast reception portion 17, a storage portion 18, and a communication portion 19.

The display portion 11 is constituted of, for example, a liquid crystal display or an EL (Electro Luminescence) display. The display portion 11 displays GUIs (Graphical User Interfaces) such as the pointer 1 and an icon 2 and a television broadcast video on the screen 3 under control of the control portion 20.

It should be noted that in the specification, a state where the GUIs such as the pointer 1 and the icon 2 are displayed on the screen 3 is referred to as PC mode and a state where a television broadcast video is displayed on the screen 3 is referred to as television broadcast mode.

The image pickup portion 13 includes an image pickup device such as a CCD (Charge Coupled Device) sensor and a CMOS (Complementary Metal Oxide Semiconductor) sensor and an infrared ray filter that selectively transmits infrared rays emitted from the light-emitting portion 37 of the remote controller 30.

The image pickup portion 13 picks up infrared rays emitted from the light-emitting portion 37 of the remote controller 30 and outputs a pickup image 40 (see FIG. 6) including information on a light spot 4 of the infrared rays to the image processing portion 14. The image processing portion 14 processes the pickup image 40 picked up by the image pickup portion 13 and outputs the image to the control portion 20.

The control portion 20 includes, for example, a CPU and a GPU (Graphics Processing Unit). The control portion 20 collectively controls the parts of the PC 10. The control portion 20 executes various operations based on the pickup image 40 input from the image processing portion 14 to thus execute processing for moving the pointer 1 on the screen 3 of the display portion 11 and processing of a click, a double-click, drag-and-drop, scroll, and the like. It should be noted that details of the processing will be given later.

The storage portion 18 includes recording media such as an HDD (Hard Disk Drive) that stores various programs requisite for control of the PC 10 and an OS (Operating System) and an SSD (Solid State Drive). Moreover, the storage portion 18 includes a nonvolatile memory such as a ROM on which BIOS (Basic Input/Output System) is recorded and a volatile memory such as a RAM that is used as a working area for operations of the control portion 20.

The communication portion 19 is connected to a communication network such as the Internet and is capable of receiving/transmitting information from/to the communication network. The received information is output to the control portion 20. For example, when HTML (Hyper Text Markup Language) data of a webpage is received, the control portion 20 analyzes the HTML data to generate image data of the webpage and controls the display portion 11 to display the webpage.

The infrared ray reception portion 15 includes an infrared ray filter that selectively transmits infrared rays emitted from the light-emitting portion 37 of the remote controller 30 and an infrared ray reception circuit. The infrared ray reception portion 15 receives the infrared rays emitted from the remote controller 30, converts the infrared rays into electric signals, and outputs the obtained electric signals to the code analysis portion 16.

The code analysis portion 16 analyzes the electric signals input from the infrared ray reception portion 15 to analyze remote control code signals input from the remote controller 30, and outputs the analyzed remote control code signals to the control portion 20.

The control portion 20 controls the PC 10 based on the input remote control code signals. For example, when the remote control code signal is to switch the PC mode and the TV broadcast mode, the PC mode and the TV broadcast mode are switched. Moreover, when a remote control code signal for switching a broadcast channel is input during the TV broadcast mode, the control portion 20 controls the television broadcast reception portion 17 to make a switch to the broadcast channel to be received.

The television broadcast reception portion 17 is a reception tuner for digital terrestrial broadcast signals, digital BS broadcast signals, CS broadcast signals, and the like. The television broadcast reception portion 17 receives program data of a broadcast program corresponding to the selected broadcast channel via an antenna 21 and outputs the data to the control portion 20.

The control portion 20 executes video processing for displaying video signals included in the program data on the display portion 11 and audio processing for outputting audio signals included in the program data from the speaker 12.

Descriptions on Operations

Next, operations of the pointing system 100 of this embodiment will be described.

Processing of Remote Controller 30

First, processing on the remote controller 30 side will be described.

Figure 5:
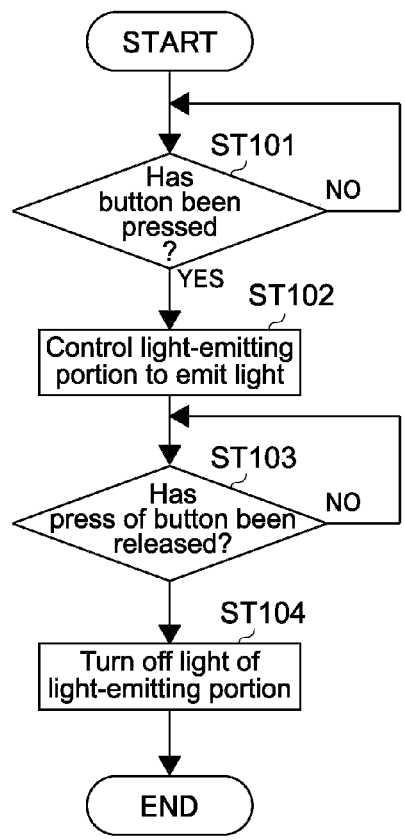
FIG. 5 is a flowchart showing processing of the remote controller.

FIG. 5 is a flowchart showing the processing of the remote controller 30.

The user holds the remote controller 30 and aims a tip end side of the remote controller 30 at the PC 10. At this time, when the PC 10 is in the TV broadcast mode in which television broadcast is broadcasted on the screen 3, the user operates the switch button 33 to switch to the PC mode.

When the user presses one of the plurality of buttons provided on the remote controller 30, the control portion 20 detects the press of the button (YES in Step 101).

It should be noted that the button to be pressed by the user may be any of the channel buttons 32, the channel up-down button 34, and the volume up-down button 35. It should also be noted that in the descriptions below, the button to be operated by the user is the channel buttons 32 (hereinafter, simply referred to as button 32) for convenience.

Upon detecting the press of the button 32, the control portion 20 controls the light-emitting portion 37 to emit infrared rays (Step 102). At this time, the control portion 20 controls the light-emitting portion 37 to emit infrared rays that flicker at a predetermined cycle.

When the user releases the press of the button 32, the control portion 20 detects the release of the press of the button 32 (YES in Step 103). Upon detecting the release of the press of the button 32, the control portion 20 controls the light-emitting portion 37 to end the light emission and turns off the light-emitting portion 37 (Step 104).

Processing of PC 10

Next, processing of the PC 10 will be described.

Setting of Base Frame 41 and Setting of Light Spot Search Frame 42

First, descriptions will be given on processing carried out when the control portion 20 of the PC 10 sets a base frame 41 and a light spot search frame 42 with respect to a pickup image 40 that has been picked up by the image pickup portion 13 and processed by the image processing portion 14.

Figure 6:
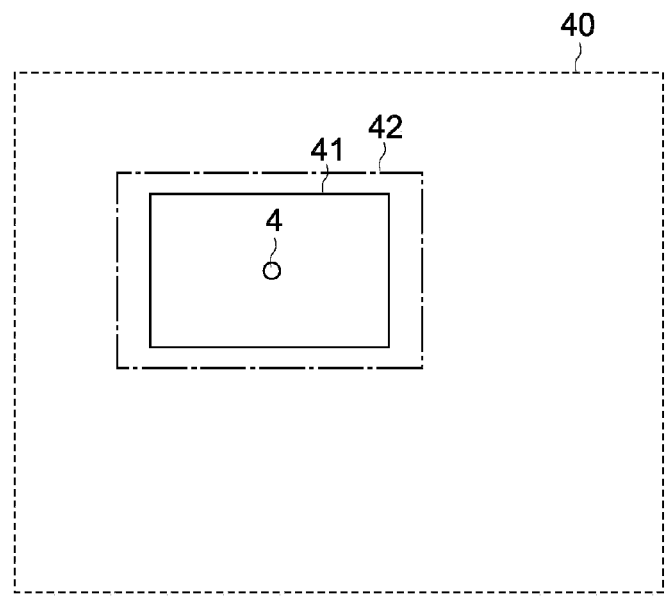
FIG. 6 is a diagram showing a pickup image, a base frame, and a light spot search frame.
Figure 7:
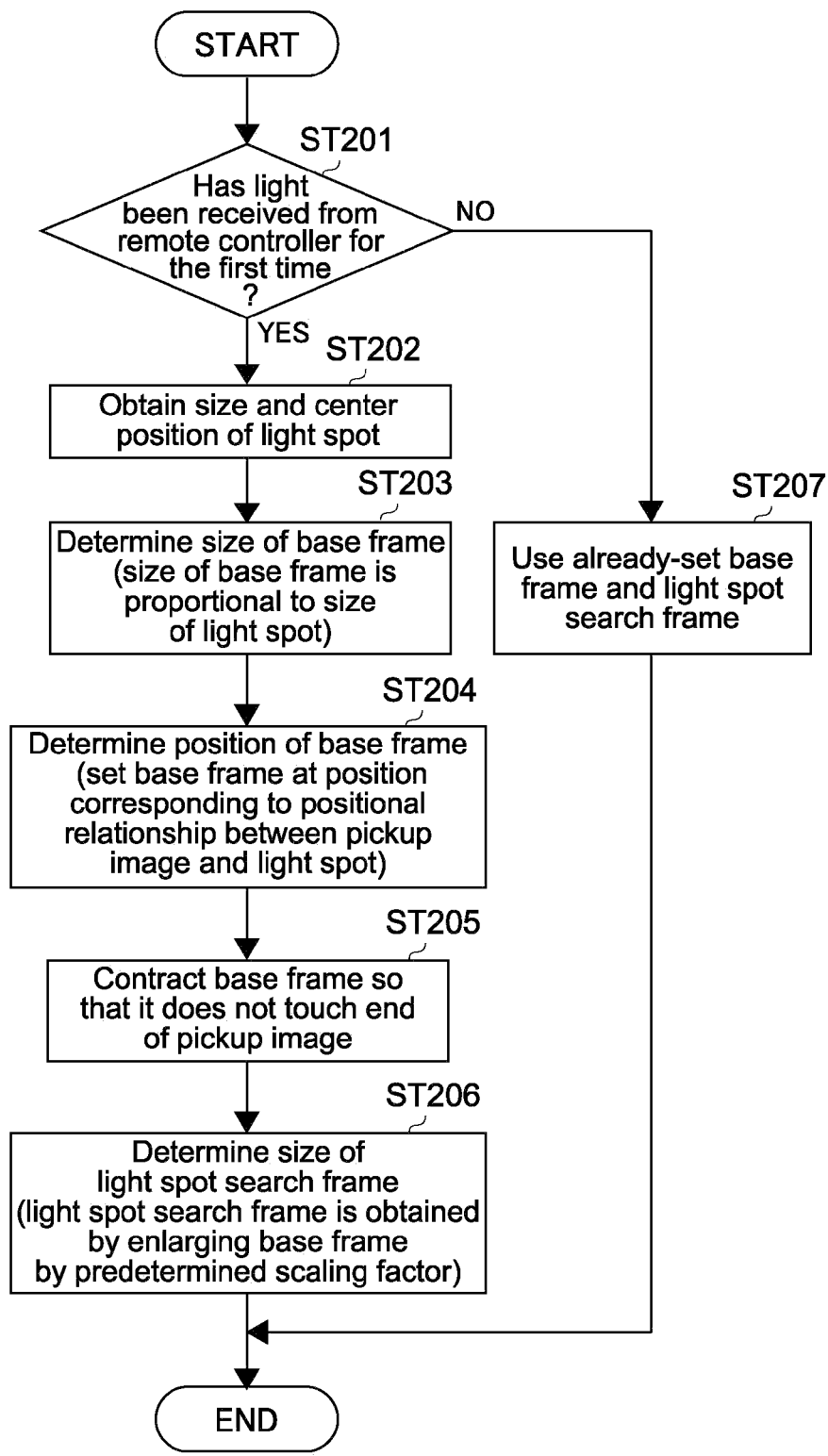
FIG. 7 is a flowchart showing processing carried out when setting the base frame and the light spot search frame.
Figure 8:
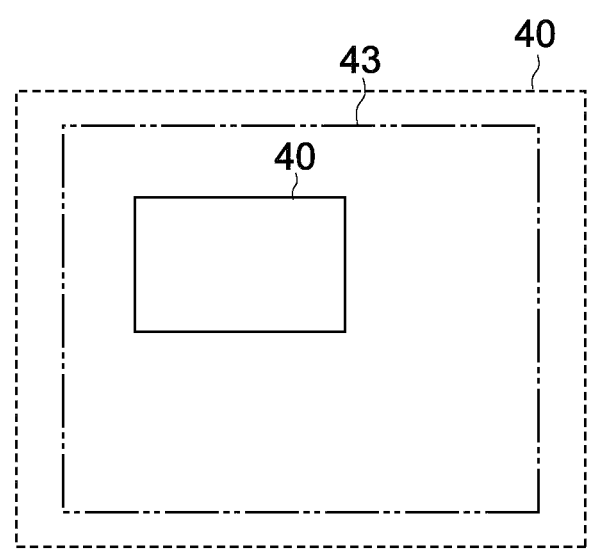
FIG. 8 is a diagram for explaining a setting position of the base frame.

FIG. 6 is a diagram showing the pickup image 40, the base frame 41, and the light spot search frame 42. FIG. 7 is a flowchart showing the processing carried out when setting the base frame 41 and the light spot search frame 42. FIG. 8 is a diagram for explaining a setting position of the base frame 41.

Although details will be given later, in this embodiment, when the remote controller 30 is operated 3-dimensionally while the user is pressing the button 32 of the remote controller 30, the pointer 1 moves on the screen 3 in accordance with the 3-dimensional movement of the remote controller 30. This principle will be explained briefly.

The remote controller 30 is moved in a state where the button 32 is pressed by the user and infrared rays are emitted from the light-emitting portion 37. At this time, the light spot 4 (high luminance point) of the infrared rays of the light-emitting portion 37 moves in accordance with the movement of the remote controller 30 in the pickup image 40 picked up by the image pickup portion 13. In other words, since the 3-dimensional movement of the remote controller 30 and the movement of the light spot 4 in the pickup image 40 are correlated, the pointer 1 moves on the screen 3 using this correlation.

Here, the movement of the light spot 4 or the like may be judged with respect to the entire pickup image 40. In this embodiment, however, for the purpose of suppressing a movement distance of the pointer 1 on the screen 3 varying depending on the distance between the remote controller 30 and the PC 10, for example, the base frame 41 is set in a size corresponding to the distance. Here, the base frame 41 is a frame to be a reference for the movement distance of the light spot 4.

Further, in this embodiment, for the purpose of removing ambient light, for example, the light spot search frame 42 is set in the pickup image 40. Here, the light spot search frame 42 is a frame for searching for the light spot 4 and determines a range in which the movement and turn-off of the light of the light spot 4 are judged.

Referring to FIG. 7, the control portion 20 of the PC 10 judges whether infrared rays have been received from the light-emitting portion 37 of the remote controller 30 for the first time (Step 201). In this case, the control portion 20 judges whether the pickup image 40 that has been picked up by the image pickup portion 13 and input by the image processing portion 14 includes a light spot 4 of the infrared rays, to thus judge whether the infrared rays have been received for the first time.

When judging that the infrared rays from the light-emitting portion 37 have been received for the first time (YES in Step 201), the control portion 20 obtains a size and center position of the light spot 4 (Step 202).

On the other hand, when judging that the infrared rays from the light-emitting portion 37 have not been received for the first time (NO in Step 201), the control portion 20 uses the already-set base frame 41 and light spot search frame 42 (Step 207).

Upon obtaining the size and center position of the light spot 4, the control portion 20 next determines a size of the base frame 41 (Step 203). In this case, the size of the base frame 41 is proportional to the size of the light spot 4. As a result, the size of the base frame 41 is proportional to the distance between the remote controller 30 and the PC 10.

Specifically, the size of the base frame 41 becomes smaller as the distance between the remote controller 30 and the PC 10 becomes larger and becomes larger as the distance becomes smaller (see FIG. 9). The movement amount of the pointer 1 on the screen 3 of the display portion 11 is determined based on the movement amount of the light spot with respect to the size of the base frame 41.

Next, the control portion 20 determines the position of the base frame 41 (Step 204). In this case, the position of the base frame 41 is set at a position corresponding to a positional relationship between the pickup image 40 and the light spot 4. For example, in a case where the positions of the light spot 4 are an upward position, downward position, leftward position, and rightward position in the pickup image 40, the base frames 41 are set at an upward position, downward position, leftward position, and rightward position in the pickup image 40.

Next, the control portion 20 contracts the base frame 41 so that it does not touch an end of the pickup image 40 (Step 205). Referring to FIG. 8, FIG. 8 shows a base frame setting range frame 43. The base frame setting range frame 43 is a little smaller than the pickup image 40. The control portion 20 judges whether at least a part of the base frame 41 crosses the base frame setting range frame 43 in Step 205. Then, when judging that at least a part of the base frame 41 crosses the base frame setting range frame 43, the control portion 20 contracts the base frame 41 so that it does not cross the base frame setting range frame 43.

By thus setting the base frame 41 within the base frame setting range frame 43, it is possible to prevent the light spot search frame 42 from sticking out from the pickup image 40.

Next, the control portion 20 determines the size of the light spot search frame 42 and sets the light spot search frame 42 around the base frame 41 (Step 206). The size of the light spot search frame 42 is determined by enlarging the base frame 41 by a predetermined scale factor, and the light spot search frame 42 is a frame that is a little larger than the base frame 41. By thus setting the light spot search frame 42 to be larger than the base frame 41, it is possible to prevent a state where the light spot 4 cannot be searched for at a time the user points an end of the screen 3 of the display portion 11 with the remote controller 30.

By setting the light spot search frame 42 inside the pickup image 40 and judging the movement of the light spot 4 or the like in the light spot search frame 42, an influence of ambient light can be eliminated.

Figure 9A:
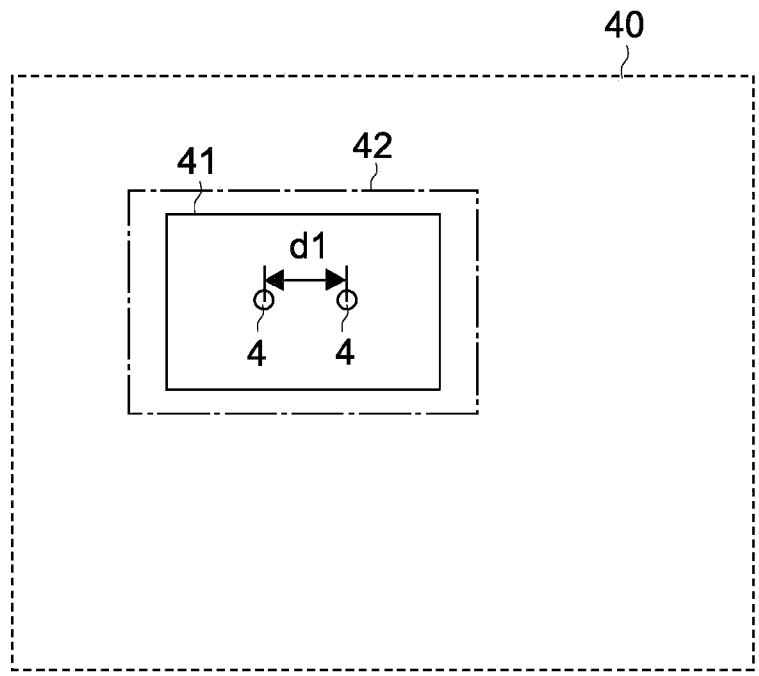
FIG. 9 are diagrams showing a movement of a light spot in the pickup image at a time the remote controller is swung laterally while a user is pressing a button of the remote controller and light is emitted from a light-emitting portion.
Figure 9B:
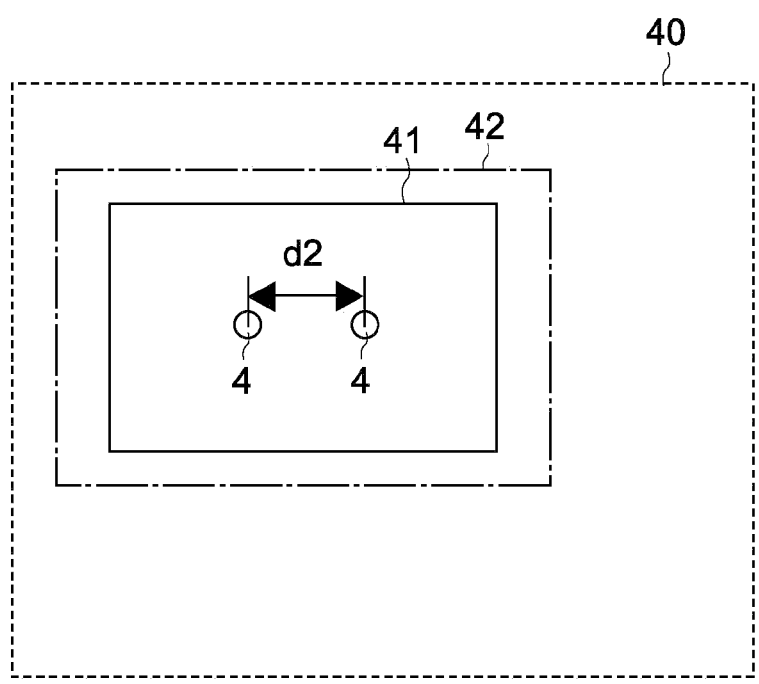

FIG. 9 are diagrams showing the movement of the light spot 4 in the pickup image 40 at a time the remote controller 30 is swung laterally while the user is pressing the button 32 of the remote controller 30 and light is being emitted from the light-emitting portion 37. FIG. 9A shows the movement of the light spot 4 at a time the user who is far from the PC 10 swings the remote controller 30, whereas FIG. 9B shows the movement of the light spot 4 at a time the user swings the remote controller 30 near the PC 10. It should be noted that in FIGS. 9A and 9B, the user is moving the remote controller 30 the same distance laterally in space.

Comparing FIGS. 9A and 9B, a ratio of a movement distance d1 of the light spot 4 with respect to the pickup image 40 and a ratio of a movement distance d2 of the light spot 4 with respect to the pickup image 40 differ. In FIGS. 9A and 9B, however, a ratio of the movement distance d1 of the light spot 4 with respect to the base frame 41 and a ratio of the movement distance d2 of the light spot 4 with respect to the base frame 41 are the same. Since the movement distance of the pointer 1 with respect to the screen 3 of the display portion 11 is determined based on the movement distance of the light spot 4 with respect to the base frame 41, the pointer 1 is moved the same distance on the screen 3 in FIGS. 9A and 9B.

Specifically, in this embodiment, it is possible to suppress the movement distance of the pointer 1 on the screen 3 varying depending on the distance between the remote controller 30 and the PC 10 (operation distance correction).

Processing when moving pointer 1 and processing of click etc.

Next, processing carried out when the pointer 1 is moved and processing of a click and the like will be described.

FIGS. 10 to 13 are flowcharts showing the processing of the PC 10 at this time.

Figure 10:
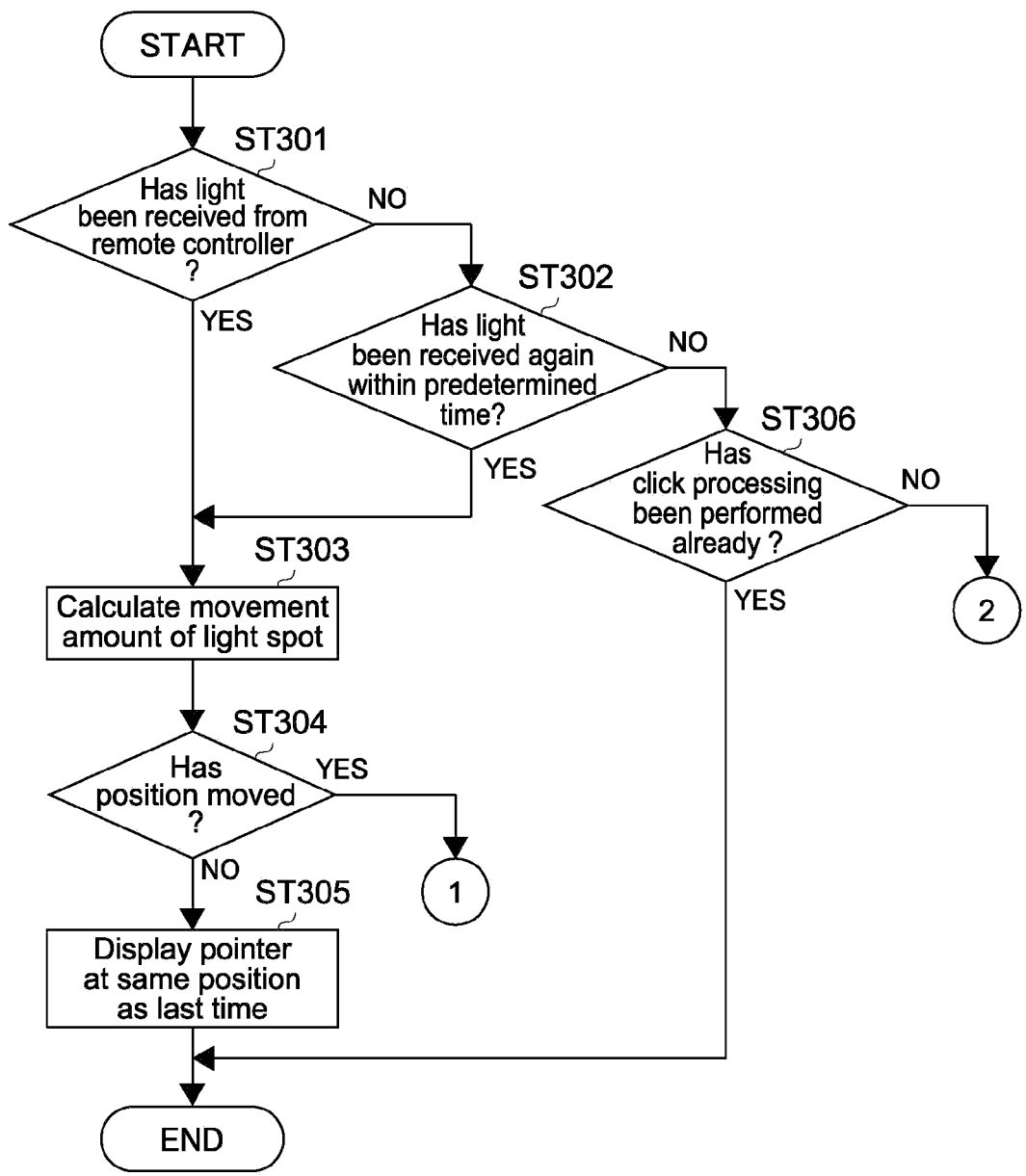

Referring to FIG. 10, the control portion 20 of the PC 10 judges whether infrared rays emitted from the light-emitting portion 37 of the remote controller 30 have been received (Step 301). In this case, the control portion 20 judges whether the infrared rays have been received by judging whether the light spot 4 of the infrared rays is included in the light spot search frame 42 in the pickup image 40 picked up by the image pickup portion 13.

When the user is pressing the button 32 while holding the remote controller 30 and aiming it at the PC 10, infrared rays are emitted from the light-emitting portion 37 to be received (YES in Step 301). When the infrared rays are received, the control portion 20 obtains a center position of the light spot 4 and calculates a movement amount of the light spot 4 with respect to the base frame 41 in the pickup image 40 (Step 303).

Next, the control portion 20 judges whether the light spot 4 has moved (Step 304). When judging that the light spot 4 has not moved (NO in Step 304), the control portion 20 displays the pointer 1 at the same position on the screen 3 as the last time (Step 305).

On the other hand, when judging that the light spot 4 has moved (YES in Step 304), the processing advances to Step 401 as the next step.

Figure 11:
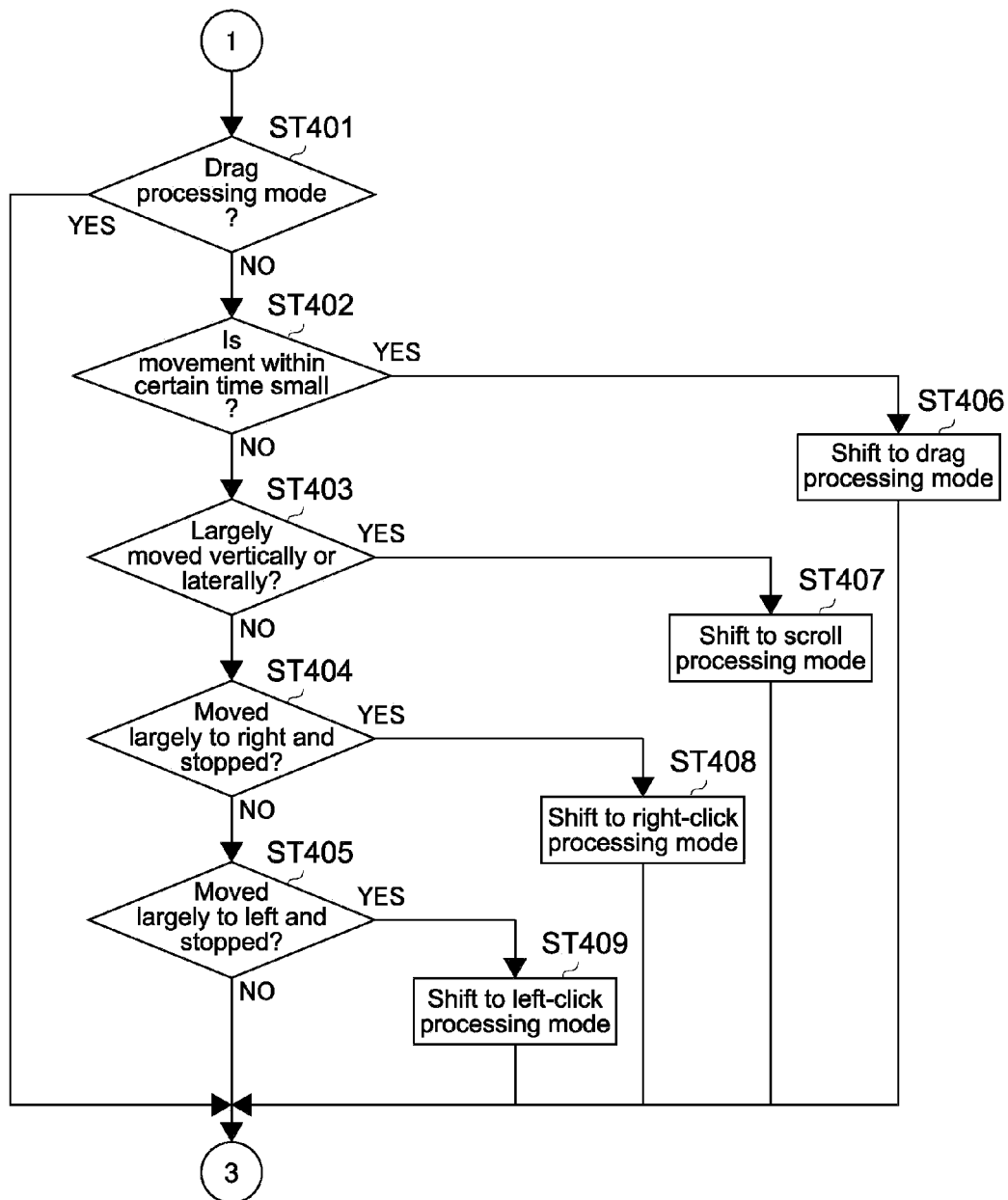

Referring to FIG. 11, the control portion 20 judges whether the current mode is a drag processing mode in Step 401.

Figure 12:
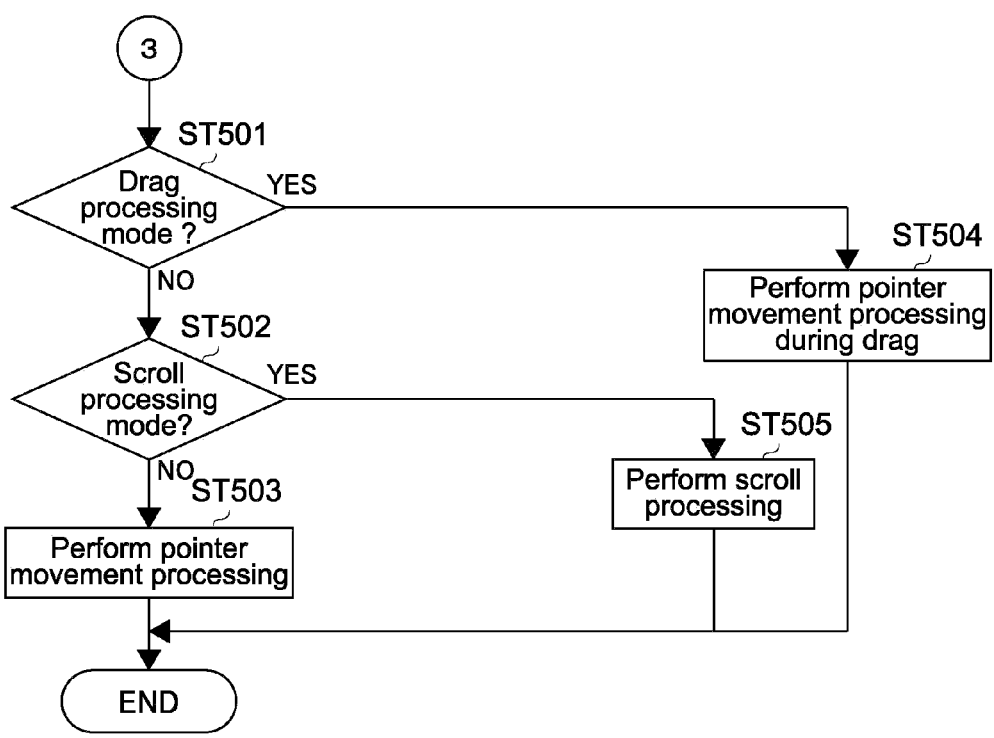

When judging that the current mode is the drag processing mode (YES in Step 401), the control portion 20 advances to Step 501 (see FIG. 12). On the other hand, when judging that the current mode is not the drag processing mode (NO in Step 401), the control portion 20 judges whether the movement of the light spot 4 within a certain time is small (Step 402).

When judging that the movement of the light spot 4 within the certain time is small (YES in Step 402), the control portion 20 shifts the mode to the drag processing mode (Step 406) and advances to Step 501.

On the other hand, when judging that the light spot 4 has moved a predetermined movement amount or more within the certain time (NO in Step 402), the control portion 20 judges whether the light spot 4 has moved largely in the vertical or lateral direction in the light spot search frame 42 of the pickup image 40 (Step 403).

When the light spot 4 has moved largely in the vertical or lateral direction (YES in Step 403), the control portion 20 shifts the mode to a scroll processing mode (Step 407) and advances to Step 501.

On the other hand, when judged negative in Step 403 (NO in Step 403), the control portion 20 judges whether the light spot 4 has moved largely to the right and stopped in the light spot search frame 42 (Step 404). When the light spot 4 has moved largely to the right and stopped (YES in Step 404), the control portion 20 shifts the mode to a right-click processing mode (Step 408) and advances to Step 501.

When judged negative in Step 404 (NO in Step 404), the control portion 20 next judges whether the light spot 4 has moved largely to the left and stopped in the light spot search frame 42 (Step 405). When judging that the light spot 4 has moved largely to the left and stopped (YES in Step 405), the control portion 20 shifts the mode to a left-click processing mode (Step 409) and advances to Step 501.

On the other hand, when judged negative in Step 405 (NO in Step 405), the drag processing mode, the scroll processing mode, and the click processing mode (right-click processing mode and left-click processing mode) are not switched, and the control portion 20 advances to Step 501 while maintaining the last processing mode.

Referring to FIG. 12, the control portion 20 judges whether the current mode is the drag processing mode in Step 501. When the current mode is the drag processing mode (YES in Step 501), the control portion 20 executes drag processing and processing for moving the pointer 1 on the screen 3 (Step 504). As a result, the user can drag the icon 2, a window, a webpage, and the like displayed on the screen 3 of the display portion 11, for example.

Here, during the drag, a movement distance of the pointer 1 and a drag target that is being dragged is a distance calculated based on the movement amount of the light spot 4 with respect to the base frame 41 in the pickup image 40 (see FIG. 9). Therefore, in both cases where the user operates the remote controller 30 3-dimensionally far from the PC 10 and the user operates the remote controller 30 3-dimensionally near the PC 10, the pointer 1 and the drag target can be moved the same way on the screen 3. It should be noted that the same holds true for scroll processing to be described later and the processing for moving the pointer 1.

When judging that the current mode is not the drag processing mode in Step 501 (NO in Step 501), the control portion 20 judges whether the current mode is the scroll processing mode (Step 502).

When the current mode is the scroll processing mode (YES in Step 502), the control portion 20 executes the scroll processing on the screen 3. As a result, the user can scroll a window displayed on the screen 3 of the display portion 11 or an image displayed in a webpage, for example.

When judging that the current mode is not the scroll processing mode in Step 502 (NO in Step 502), the control portion 20 moves the pointer 1 on the screen 3 in accordance with the movement amount of the light spot 4 with respect to the base frame 41 in the pickup image 40 (Step 503).

Referring back to FIG. 10, when judging that the infrared rays from the light-emitting portion 37 of the remote controller 30 have not been received in Step 301 (NO in Step 301), the control portion 20 judges whether the infrared rays from the light-emitting portion 37 have been received again within a predetermined time (Step 302). The predetermined time is set as appropriate in consideration of a flickering cycle of the light-emitting portion 37.

Based on the judgment of Step 302, the control portion 20 can distinguishably recognize the turn-off of the light of the light spot 4 based on the flickering of the light-emitting portion 37 and the turn-off of the light of the light spot 4 based on a release of a press of the button 32.

When the infrared rays from the light-emitting portion 37 have been received again within the predetermined time (YES in Step 302), the control portion 20 advances to Step 303 as in the case where it is judged that the infrared rays have been received in Step 301, and executes the processing of Step 303 and the subsequent steps described above.

On the other hand, when the infrared rays from the light-emitting portion 37 have not been received again within the predetermined time (NO in Step 302), the control portion 20 advances to Step 306 as the next step. In Step 306, the control portion 20 judges whether the click processing has already been carried out. When the click processing has already been carried out (YES in Step 306), the control portion 20 ends the processing as it is. On the other hand, when the click processing has not been carried out yet (NO in Step 306), the control portion 20 advances to Step 601 as the next step.

Figure 13:
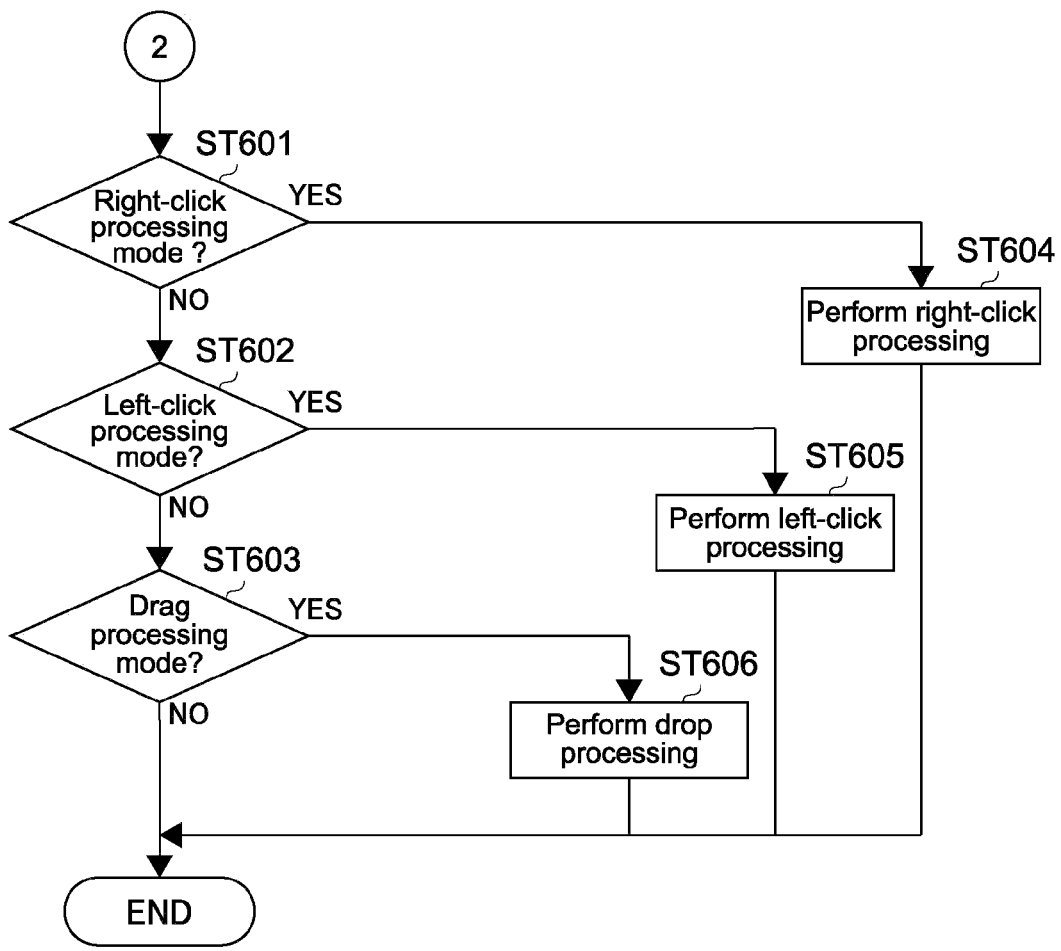

Referring to FIG. 13, in Step 601, the control portion 20 judges whether the current mode is the right-click processing mode. When the current mode is the right-click processing mode (YES in Step 601), the control portion 20 executes the right-click processing. In this case, the control portion 20 executes display processing of a relevant menu or the like at the position of the pointer 1 at that time, for example.

On the other hand, when the current mode is not the right-click processing mode (NO in Step 601), the control portion 20 judges whether the current mode is the left-click processing mode (Step 602). When the current mode is the left-click processing mode (YES in Step 602), the control portion 20 executes the left-click processing (Step 605). In this case, when the position of the pointer 1 at that time is on the icon 2, for example, the control portion 20 carries out processing of selecting and executing that icon 2.

On the other hand, when the current mode is not the left-click processing mode (NO in Step 602), the control portion 20 judges whether the current mode is the drag processing mode (Step 603). When the current mode is the drag processing mode (YES in Step 603), the control portion 20 executes drop processing (Step 606).

By the processing shown in FIGS. 10 to 13, the user can easily move the pointer 1 on the screen 3 by operating the remote controller 30 3-dimensionally while pressing the button 32. Moreover, the user can easily perform operations of a right-click and a left-click by canceling the press of the button 32 of the remote controller 30 (click processing mode) (see Steps 604 and 605).

Further, the user can easily switch the right-click processing mode in which a right-click is executed at a time the press of the button 32 is released and the left-click processing mode in which a left-click is executed at a time the press of the button 32 is released by operating the remote controller 30 3-dimensionally (see Steps 404 and 405).

When switching the left-click processing mode to the right-click processing mode, the user only needs to swiftly move the remote controller 30 to the right and stop while pressing the button 32 (see Step 404). On the other hand, when switching the right-click processing mode to the left-click processing mode, the user only needs to swiftly move the remote controller 30 to the left and stop while pressing the button 32 (see Step 405).

Furthermore, the user can drag a drag target by positioning the pointer 1 on the drag target such as the icon 2, a window, and a webpage on the screen 3 for a certain time (see Step 402). Then, by operating the remote controller 30 3-dimensionally while pressing the button 32 and releasing the press of the button 32 after moving the drag target to a target position, the user can drop the drag target (see Steps 504 and 606).

Moreover, by swiftly moving the remote controller 30 in the vertical or lateral direction after positioning the pointer 1 on a scroll target such as a window and a webpage, the user can scroll the scroll target (see Steps 403 and 505).

In addition, since the remote controller 30 of this embodiment takes a form in which the light-emitting portion 37 flickers at a predetermined cycle, power of the remote controller 30 can be saved.

On the other hand, the control portion 20 of the PC 10 is capable of recognizing which of the turn-off of the light based on the flickering of the light-emitting portion 37 and the turn-off of the light based on the release of the press of the button 32 the turn-off of the light of the light spot 4 is (see Step 302). Then, when the turn-off of the light is based on the flickering, the control portion 20 does not execute the right-click, left-click, and drag processing (see YES of Step 302). As a result, it is possible to prevent false operations from being executed by the right-click, left-click, and drag processing being executed due to the cyclical flickering of the remote controller 30.

Furthermore, in the PC 10 of this embodiment, the processing for moving the pointer 1 and the click (right-click and left-click), drag-and-drop, and scroll processing are realized based on the movement of a single light spot 4 in the pickup image 40 and turn-off of the light of the light spot 4. As a result, the remote controller 30 that is generally used as a remote controller 30 for a display-portion-integrated PC 10 and a television apparatus can be made to function as a pointing device with which the pointer 1 can be moved and operations such as a click can be made. Accordingly, since there is no need to use a special remote controller 30, costs can be cut.

Moreover, since the judgment on the turn-off of the light of the light spot 4 is executed with respect to the turn-off of the light within the light spot search frame 42 (see Step 301), the right-click, left-click, and drop processing are not executed when the light of the light spot 4 is turned off outside the light spot search frame 42. As a result, false operations as in a case where a click or the like is executed when the press of the button 32 is released while the user is pointing the position outside the screen 3 with the remote controller 30 are prevented from occurring.

Modified Example of First Embodiment

In the above descriptions, the mode has shifted to the drag processing mode when the movement of the light spot 4 within a certain time is small, and the mode has shifted to the scroll processing mode when the light spot 4 largely moves vertically and laterally. Further, the mode has shifted to the right-click processing mode when the light spot 4 largely moves to the right and stops, and the mode has shifted to the left-click processing mode when the light spot 4 largely moves to the left and stops. However, the conditions for the shifts to the processing modes described above are not limited thereto.

Typically, the conditions for the shifts to the processing modes descried above may be allocated to any movements of the light spot 4 that are not normally used when the user operates the remote controller 30 3-dimensionally to move the pointer 1.

Although the above descriptions have been given on the case where the condition for switching the right-click processing mode to the left-click processing mode and the condition for switching the left-click processing mode to the right-click processing mode differ, the conditions may be the same.

Moreover, although the above descriptions have been given on a single-click, a double-click may be executed (both right- and left-hand sides). For example, left double-click processing may be executed when the pointer 1 is positioned on an icon 2 on a desktop.

Second Embodiment

Next, a second embodiment will be described.

It should be noted that in the descriptions on the second embodiment and the subsequent embodiments, parts having the same structures and functions as those of the first embodiment are denoted by the same reference numerals, and descriptions thereof will be simplified or omitted.

Figure 14:
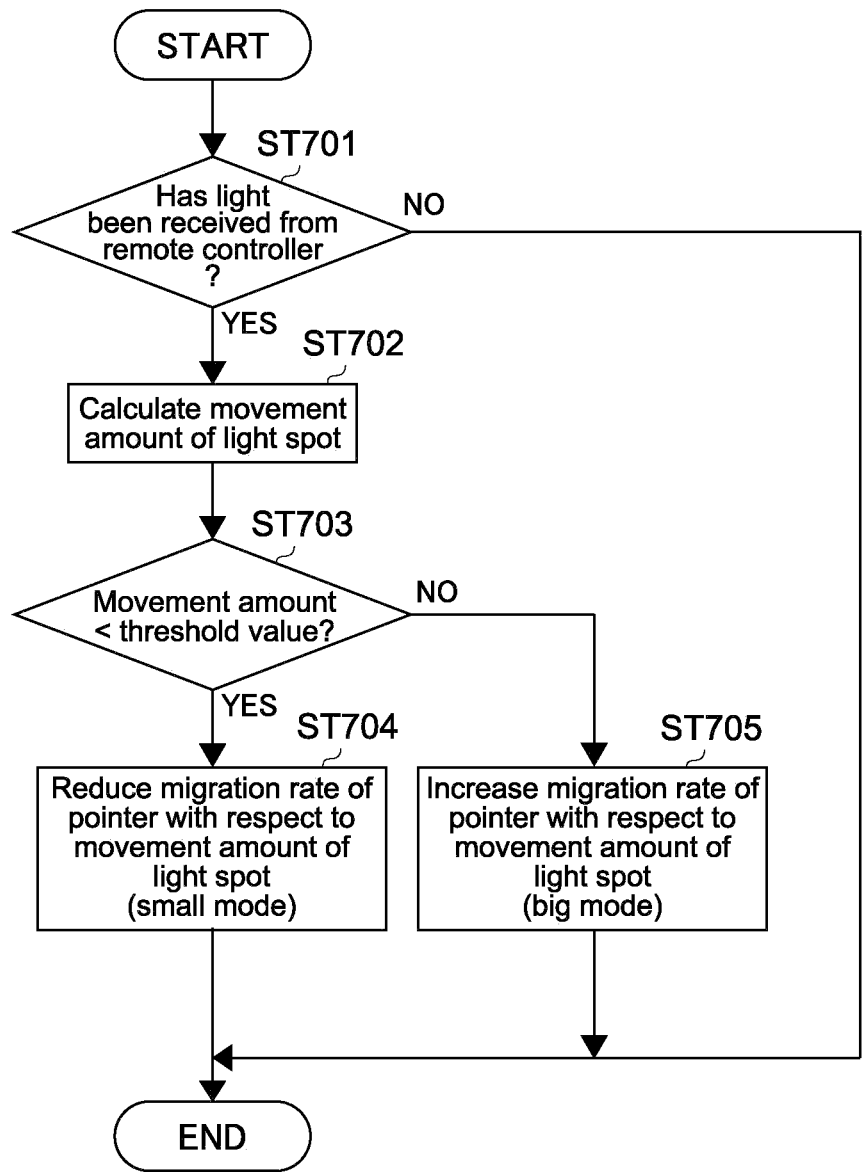
FIG. 14 is a flowchart showing processing of a PC of a pointing system according to another embodiment.

FIG. 14 is a flowchart showing processing of the PC 10 of the pointing system 100 according to the second embodiment.

The control portion 20 of the PC 10 judges whether infrared rays emitted from the light-emitting portion 37 of the remote controller 30 have been received (Step 701). In this case, the control portion 20 judges whether the infrared rays have been received by judging whether the light spot 4 of the infrared rays is within the light spot search frame 42 of the pickup image 40 picked up by the image pickup portion 13.

When the user presses the button 32 while holding the remote controller 30 and aiming it at the PC 10, infrared rays are emitted from the light-emitting portion 37 to be received (YES in Step 701). When the infrared rays are received, the control portion 20 calculates a movement amount of the light spot 4 with respect to the base frame 41 of the pickup image 40 (Step 702).

Next, the control portion 20 judges whether the calculated movement amount of the light spot 4 is smaller than a predetermined threshold value (Step 703). The threshold value is set as appropriate in consideration of a level of a hand movement of the user.

When the movement amount of the light spot 4 is smaller than the predetermined threshold value (YES in Step 703), the control portion 20 reduces a movement rate of the pointer 1 on the screen 3 with respect to the movement amount of the light spot 4 (Step 704) (small mode (first mode)).

On the other hand, when the movement amount of the light spot 4 is equal to or larger than the predetermined threshold value (NO in Step 703), the control portion 20 increases the movement rate of the pointer 1 on the screen 3 with respect to the movement amount of the light spot 4 (Step 705) (big mode (second mode)).

By carrying out the processing as described above, the movement of the pointer 1 on the screen 3 becomes markedly small when the 3-dimensional movement of the remote controller 30 is small. As a result, it becomes possible to suppress wobbling of the pointer 1 on the screen 3 due to an influence of a hand movement. Moreover, the user can precisely control the pointer 1 on the screen 3.

On the other hand, when the 3-dimensional movement of the remote controller 30 is large, the movement of the pointer 1 on the screen 3 becomes markedly large. As a result, when wishing to largely move the pointer 1, the user can efficiently move the pointer 1 by largely moving the remote controller 30 3-dimensionally.

In the example shown in FIG. 14, the modes have been the big mode and the small mode. However, the modes may be 3 steps or more.

The threshold value may be subjected to processing so that it varies in the small mode and the big mode. In this case, the threshold value may be subjected to processing so that it becomes large in the small mode and becomes small in the big mode. As a result, stable operations become possible among the modes.

Alternatively, the control portion 20 may cancel the processing related to a click (left- and right-single click, left- and right-double-click) when the light of the light spot 4 is turned off inside the pickup image 40 (light spot search frame 42) in the big mode. Normally, the user often does not largely move the remote controller 30 3-dimensionally when performing an operation related to a click. In other words, when the light of the light spot 4 is turned off inside the pickup image 40 in the big mode, it is often a false operation. In this regard, when the light of the light spot 4 is turned off inside the pickup image 40 (light spot search frame 42) in the big mode, the control portion 20 may cancel the processing related to a click. As a result, false operations are prevented from being made.

Modified Examples

In the descriptions on the above embodiments, the display-portion-integrated PC 10 in which the display portion 11 and the PC 10 are integrated has been described as an example of the control device. However, the control device is not limited thereto. For example, the display portion 11 and the PC 10 may be independent devices. Moreover, the image pickup portion 13 may also be provided independent from the display portion 11 and the PC 10. Other examples of the control device include a television apparatus and a car navigation apparatus.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A pointing system, comprising:
   a pointing device including
      an operation portion, and
      a light-emitting portion that emits light in accordance with an operation to the operation portion; and
   a control device including
      an image pickup portion that picks up light from the light-emitting portion at a time the light-emitting portion emits light and outputs an image including information on a light spot of the light,
      a display portion that includes a screen and displays a pointer on the screen, and
      a control portion that sets a base frame, the base frame is set in a size corresponding to a distance between the pointing device and the display portion,
   wherein the control portion that judges, as well as judges a movement of the light spot based on the information on the light spot in the image and moves the pointer on the screen based on the movement of the light spot, whether the light of the light spot is turned off based on the information on the light spot in the image and executes processing related to a click at a time the light of the light spot is turned off,
   wherein the control portion is configured to judge whether the movement of the light spot is smaller or larger than a predetermined movement amount within a certain time and switch a processing mode based on the movement and turn-off of the light spot to move the pointer on the screen,
   wherein the light spot is located within the base frame and the light spot is configured to move with respect to the base frame,
   wherein the control portion is configured to set a light spot search frame, the light spot search frame is moveable along with the base frame and always surrounds the base frame, and wherein the light spot search frame is larger than the base frame and the light spot search frame is smaller than the image pickup portion.

2. The pointing system according to claim 1,
   wherein the control portion judges whether the movement of the light spot satisfies a predetermined condition and switches, when the movement of the light spot satisfies the predetermined condition, between a left-click processing mode in which processing related to a left-click is executed at the time the light of the light spot is turned off and a right-click processing mode in which processing related to a right-click is executed at the time the light of the light spot is turned off.

3. The pointing system according to claim 1,
   wherein the control portion judges whether the movement of the light spot satisfies a predetermined condition and switches, when the movement of the light spot satisfies the predetermined condition, a click processing mode in which the pointer is moved in accordance with the movement of the light spot and the processing related to a click is executed at the time the light of the light spot is turned off to a drag processing mode in which drag is executed in accordance with the movement of the light spot and drop is executed at the time the light of the light spot is turned off.

4. The pointing system according to claim 1, wherein the control portion judges whether the movement of the light spot satisfies a predetermined condition and switches, when the movement of the light spot satisfies the predetermined condition, a click processing mode in which the pointer is moved in accordance with the movement of the light spot and the processing related to a click is executed at the time the light of the light spot is turned off to a scroll processing mode in which scroll is executed in accordance with the movement of the light spot.

5. The pointing system according to claim 1, wherein the light-emitting portion outputs periodical emission of the light when the operation portion is operated,
wherein the control portion is configured to judge whether turn-off of the light from the light-emitting portion is due to the periodical emission or is due to a cancellation of the operation to the operation portion, and
wherein the control portion does not execute a click related processing when the turn-off of the light from the light-emitting portion is due to the periodical emission, and the control portion executes the click related processing when the turn-off of the light from the light-emitting portion is due to the cancellation of the operation to the operation portion.

6. The pointing system according to claim 1, wherein the control portion judges a size of the light spot in the image, the size of the base frame corresponding to the size of the light spot, and moves the pointer on the screen in accordance with the movement of the light spot in the base frame.

7. The pointing system according to claim 6, wherein the control portion sets a light spot search frame around the base frame in the image and judges the movement of the light spot and the turn-off of the light of the light spot in the light spot search frame.

8. The pointing system according to claim 1, wherein the base frame is always inside of the light spot search frame.

9. The pointing system according to claim 1, wherein the control portion is configured to set a base frame setting range frame and the base frame is within the base frame setting range frame.

10. The pointing system according to claim 1, wherein a ratio of a first movement distance of the pointer on the screen with respect to the base frame at a first distance between the pointing device and the display portion is always same as a ratio of a second movement distance of the pointer on the screen with respect to the base frame at a second distance between the pointing device and the display portion.

11. The pointing system according to claim 10, wherein the first distance and the second distance are different.

12. The pointing system according to claim 1, wherein the light-emitting portion is configured to output periodical emission of the light, and wherein the control portion does not execute a click related processing during the periodical emission of the light.

13. The pointing system according to claim 1, wherein the control portion is configured to calculate a movement amount of the light spot with respect to the base frame and when the movement amount of the light is smaller than a predetermined threshold value, the control portion reduces a movement rate of the pointer.

14. The pointing system according to claim 1, wherein the control portion is configured to calculate a movement amount of the light spot with respect to the base frame and when the movement amount of the light is equal to or larger than a predetermined threshold value, the control portion increases a movement rate of the pointer.

15. A control device picking up light from a light-emitting portion of a pointing device including an operation portion and the light-emitting portion that emits light in accordance with an operation to the operation portion and moves a pointer on a screen based on information on a light spot of the light included in the pickup image, the control device comprising:
an image pickup portion configured to pick up light from the light-emitting portion at a time the light-emitting portion emits light and output the image including information on the light spot;
a display portion including the screen and configured to display the pointer on the screen; and
a control portion that sets a base frame, the base frame is set in a size corresponding to a distance between the pointing device and the display portion,
wherein the control portion configured to judge, as well as judge a movement of the light spot based on the information on the light spot in the image and move the pointer on the screen based on the movement of the light spot, whether the light of the light spot is turned off based on the information on the light spot in the image and execute processing related to a click at a time the light of the light spot is turned off,
wherein the control portion is configured to judge whether the movement of the light spot is smaller or larger than a predetermined movement amount within a certain time and switch a processing mode based on the movement and turn-off of the light spot to move the pointer on the screen,
wherein the light spot is located within the base frame and the light spot is configured to move with respect to the base frame,
wherein the control portion is configured to set a light spot search frame, the light spot search frame is moveable along with the base frame and always surrounds the base frame, and wherein the light spot search frame is larger than the base frame and the light spot search frame is smaller than the image pickup portion.

16. The control device according to claim 15, wherein the light-emitting portion outputs periodical emission of the light when the operation portion is operated,
wherein the control portion is configured to judge whether turn-off of the light from the light-emitting portion is due to the periodical emission or is due to a cancellation of the operation to the operation portion, and
wherein the control portion does not execute a click related processing when the turn-off of the light from the light-emitting portion is due to the periodical emission, and the control portion executes the click related processing when the turn-off of the light from the light-emitting portion is due to the cancellation of the operation to the operation portion.

17. A control method in a pointing system having a control device including a control portion, comprising:
- picking up light from a light-emitting portion that emits light in accordance with an operation to an operation portion;
- outputting an image including information on a light spot of the light;
- setting a base frame in the image, the base frame is set in a size corresponding to a distance between a pointing device and a display portion,
- judging a movement of the light spot based on the information on the light spot in the image, wherein the control portion is configured to judge whether the movement of the light spot is smaller or larger than a predetermined movement amount within a certain time;
- moving a pointer on a screen of the display portion in accordance with the movement of the light spot;
- judging turn-off of the light of the light spot based on the information on the light spot in the image;
- switching a processing mode based on the movement and turn-off of the light spot to move the pointer on the screen; and
- executing processing related to a click at a time the light of the light spot is turned off, wherein the light spot is located within the base frame and the light spot is configured to move with respect to the base frame, wherein the control portion is configured to set a light spot search frame, the light spot search frame is moveable along with the base frame and always surrounds the base frame, and wherein the light spot search frame is larger than the base frame and the light spot search frame is smaller than the image pickup portion.

18. The control method according to claim 17, wherein the light-emitting portion outputs periodical emission of the light when the operation portion is operated, wherein the control portion is configured to judge whether turn-off of the light from the light-emitting portion is due to the periodical emission or is due to a cancellation of the operation to the operation portion, and wherein the control portion does not execute a click related processing when the turn-off of the light from the light-emitting portion is due to the periodical emission, and the control portion executes the click related processing when the turn-off of the light from the light-emitting portion is due to the cancellation of the operation to the operation portion.

* * * * *